Patented Aug. 20, 1935

2,011,929

UNITED STATES PATENT OFFICE 2,011,929

ELECTRIC SUPPLY FOR LAMPS IN COAL MINES AND LIKE PLACES

William Cramp, Edgbaston, Birmingham, and Norman Halifax Searby, Erdington, Birmingham, England Application October 28, 1932, Serial No. 640,076
In Great Britain November 6, 1931

10 Claims. (Cl. 171—97)

This invention relates to alternating current electric power supply apparatus for lighting purposes, apparatus in accordance with the invention being particularly useful in mines in which there is a risk of explosion, the object being the provision of reliable apparatus which may safely be used in places where inflammable gases are liable to occur.

In alternating current electric power supply apparatus according to the present invention the primary windings of a number of transformers are joined in series with one another and the transformers are so arranged that the supply of power to the load connected with the secondary winding of a transformer may be interrupted by reducing the mutual induction between the primary and secondary windings of the transformer to zero or to a negligible value.

In one arrangement the primary windings of a plurality of transformers are connected in series with one another and are associated with a constant voltage source, whilst the secondary windings of the transformers are readily removable and the reluctance of the magnetic circuit of a transformer is the same or differs but little whether the secondary winding is in position or is removed. The series connected primary windings are connected between a terminal and the earthed neutral or second earthed terminal of the secondary winding of a main transformer and the conductor of the cable connected with the neutral point serves to earth exposed metal parts of the transformers.

Conveniently the core of the transformer is disposed within a casing of non-magnetic material possessing a relatively high electrical resistance and the primary winding of the transformer is enclosed in a container of non-magnetic material filled with insulating compound and split longitudinally into parts insulated from one another. The secondary winding is enclosed in the same manner, or/and a cover on which the secondary winding is mounted is formed with a flange that fits the main part of the casing and extends around and protects the secondary winding.

A yoke of magnetic material is removable with the secondary winding and the yoke is of relatively small cross-section. The cover on which the secondary winding is mounted is provided with catches or equivalent means for maintaining the winding in position.

Figure 2:
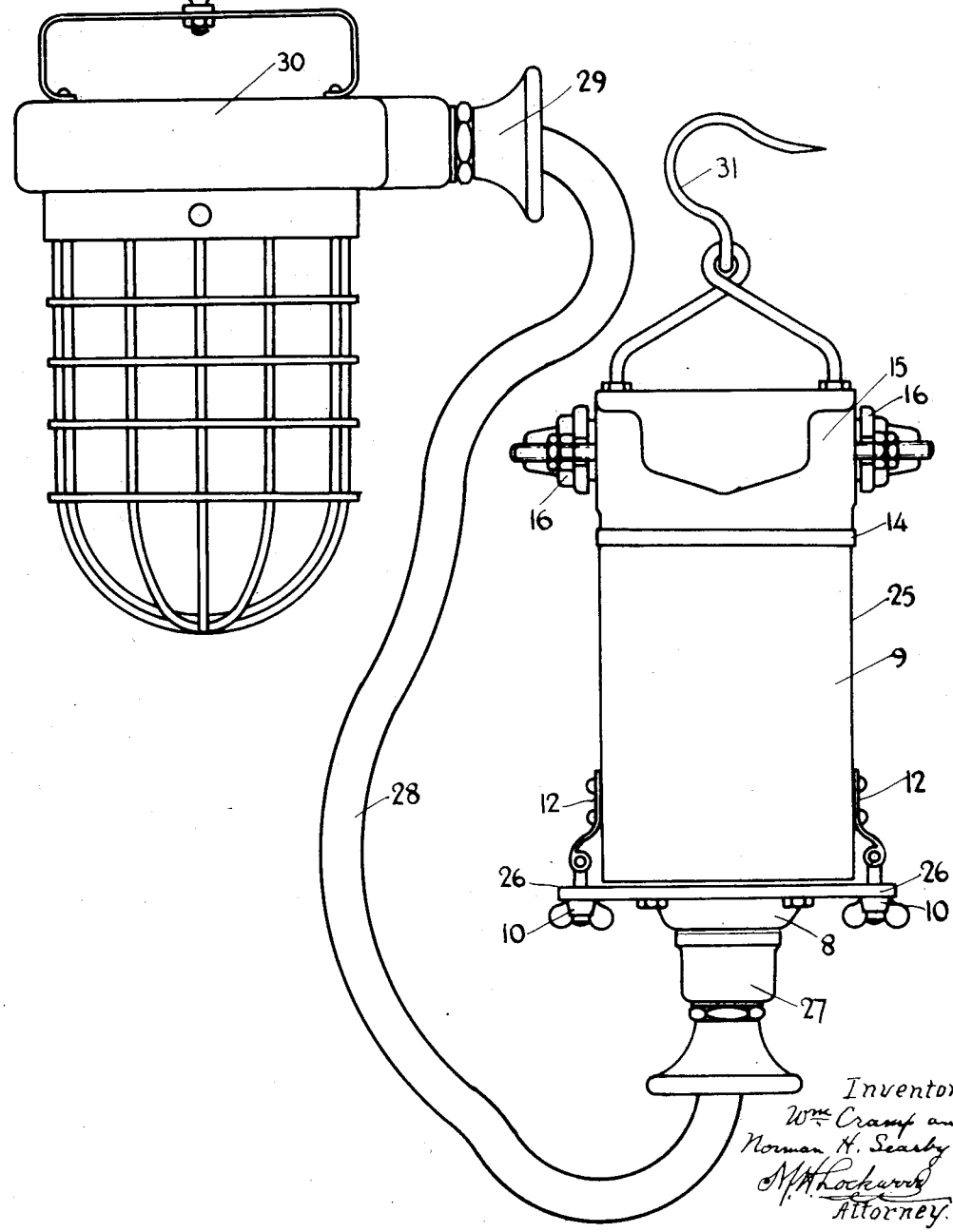
Figure 3:
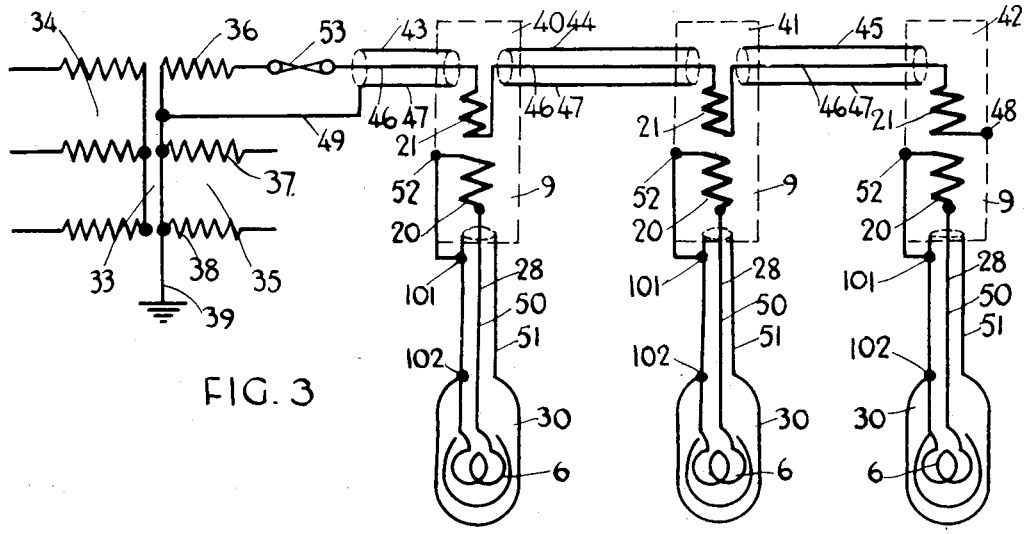
Figure 4:
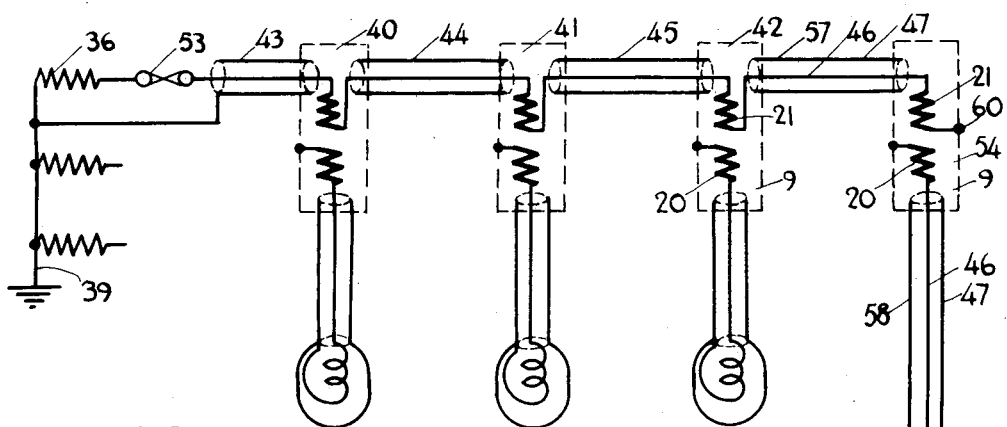

The invention will now be described, by way of example, with reference to the accompanying drawings, Figure 1 of which shows in elevation a unit comprising a transformer and lamp fitting, the left hand half with the exception of the lowermost portion or sub-base being in section; Figure 2 is a side view of a modified arrangement in which the transformer is connected with a lamp fitting through a flexible cable; Figure 3 is a diagram of connections of a lighting installation and Figure 4 is a diagram of a modified arrangement showing how the lamps may be sectionalized so that a group of lamps may be connected in circuit or cut out and if desired removed by separating the primary and secondary windings of an additional transformer.

Figure 1:
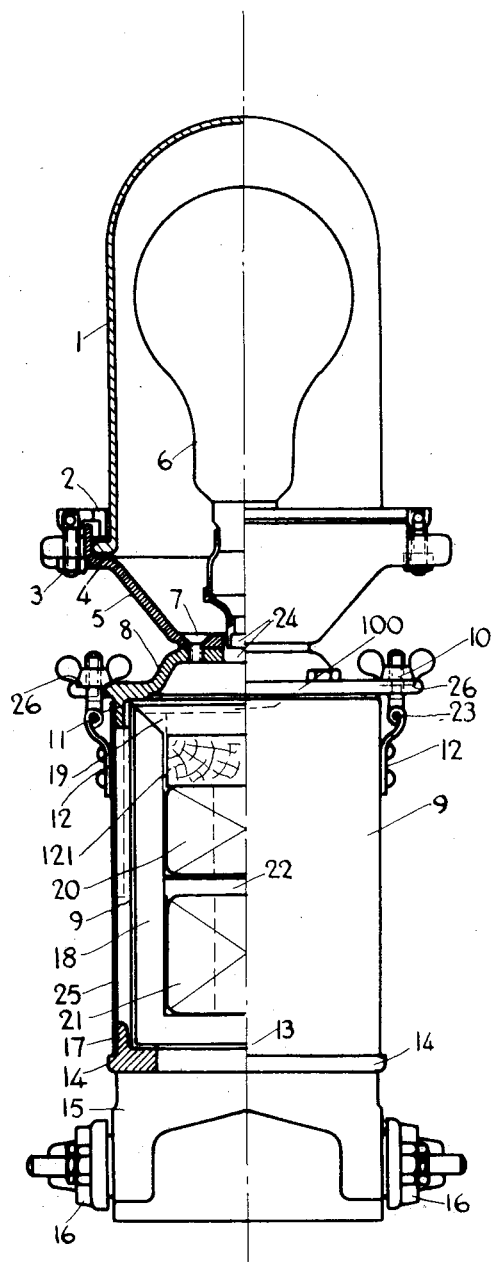

Referring to Figure 1, a bell glass is attached in a gas tight manner by the ring 2, bolts 3 and packing rings 4, that engage a peripheral flange of the bell glass, to a support 5. The bolts 3 may be locked in some suitable way so that only authorized persons can remove the bell glass. The glass 1 contains an appropriate incandescent electric lamp 6, held in suitable manner in a lamp holder secured to the support 5 and the latter is fixed by screws 7 to the cover 8 of a metal casing 9 which is of high resistance non-magnetic material, for example, the alloy denoted by the registered trade-mark "No-Mag". The cover 8 and support 5 have central holes 24 through which the leads from a transformer secondary winding 20 pass to the terminals of the socket into which the lamp 6 is fitted. The cover 8 is provided with a flange 11 that fits within the cylindrical side wall 25 of the casing 9 and is held to the wall 25 by wing nuts and screws 10 which are pivoted to hinge lugs 12 of the wall 25 and engage slotted lugs 26 of the cover 8. The wall 25 is fixed by screw-threads 13 to a flange 17 on the base 14 of the casing, which in turn is attached to or forms part of a sub-base 15 furnished with suitable glands 16 adapted to receive the ends of the lengths of supply cable.

Within the casing 9 is the laminated transformer core formed of stampings and including a main E-shaped portion, which is fixed to the base 14 and comprises a central limb 22 and two outer limbs 18, and a yoke 19. Conveniently the width of the central limb is twice the width of the remaining part of the core and the ends of the outer limbs are bevelled to fit correspondingly bevelled ends of the yoke.

The yoke 19 is fixed to the cover 8 and attached to the lower side of the yoke in any suitable way is the secondary coil 20 which may be spaced from the yoke by a block 121 of insulating material, the coil and the block being adapted to slide over the limb 22 and to fit between the limbs 18.

The yoke 19 is designed so that during operation it is magnetically saturated to a certain extent whereby when the yoke is removed the reluctance of the magnetic circuit is not greatly varied. In addition or as an alternative the limb 22 may be of such length that when the yoke is in position there is an air gap between the end of the limb and the yoke. It is, however, preferred to rely on magnetic saturation of the yoke and this may conveniently be arranged by disposing between the iron laminations of the yoke brass washers or packing strips of insulating material.

The leads of the primary coil 21 are connected to suitable terminals in the sub-base 15 and preferably the coil is enclosed or otherwise protected from the deleterious influences of the atmosphere. This can be done by enclosing the coil in an annular container formed, for example, of the alloy denoted by the registered trademark "No-Mag" and filling the container with insulating compound. The container is split longitudinally and the parts are insulated from one another at the joints by mica or other suitable material in order to prevent the container from acting as a short-circuited secondary winding. The secondary winding 20 may be enclosed in a similar manner, or/and the flange 11 may be extended as indicated by dotted lines in Figure 1 so that it surrounds and mechanically protects the winding. Such extension of the flange is advantageous, moreover, since the path between the interior and the exterior of the transformer is a long annulus defined by metal walls which would adequately prevent flame passing from the interior of the casing to an ambient explosive mixture.

During operation, if it is wished to extinguish or renew the lamp 6, by operating the wing nuts and screws 10 and withdrawing the cover 8 together with the yoke 19 and secondary winding 20 the latter is deenergized without the interruption of any circuit and without the accompanying danger of sparking.

In the modification shown in Figure 2 the lamp fitting or lantern is separate from the transformer, a flexible cable 28 passing through glands 27 and 29 provided respectively on the cover 8 and on the enclosed flame-proof lantern 30. The transformer and lantern are fitted with hooks 31 and 32 by which they may severally be suspended.

The cable 28 incorporates an earthing wire that connects together the exposed metal parts of the lantern and the transformer and whether the construction is in accordance with Figure 1 or Figure 2 of the drawings the cable through which power is supplied to the primary windings of the transformers includes an earthing wire connected with the exposed metal parts of the transformers and to earth.

In Figure 3 a main constant voltage transformer 33 includes three phase primary and secondary windings 34 and 35 the secondary phase windings 36, 37 and 38 being star connected and earthed at 39. Three series connected transformers 40, 41 and 42 such as are illustrated in Figure 2 are shown, there being a length of cable 43 between the main transformer 33 and the transformer 40, a length of cable 44 between the transformers 40 and 41 and a length of cable 45 between the transformers 41 and 42. The cable, which is flexible, is of the kind comprising an inner core 46 and a concentric outer conductor 47 of braided wire, insulated from the core and protected against mechanical damage by a suitable covering that may include armouring. The length of cable 43 passes at one end through a gland in an explosion proof fuse box (not shown) and the outer conductor 47 at that end is connected by a conductor 49 to the earth 39. At the other end the conductor 47 is connected with the casing 9 of the transformer 40. The core of the length of cable 43 is connected at the one end through a fuse 53 contained in the aforesaid fuse box to the phase winding 36 of the main transformer 33 and at the other end to a terminal of the primary winding 21 of the transformer 40. The outer conductor of each other length of cable is connected at opposite ends to the respective casings and cores of the transformers with which the length is associated and the core of the said length of cable is connected at opposite ends to terminals of the primary coils of the transformers with which the length is associated. Naturally, the neighbouring ends of the outer conductors of adjacent lengths of cable are suitably connected or bonded together.

One terminal 48 of the transformer 42 at the far end of the series connected transformers is joined at 48 to the casing of the said transformer. It will be seen, therefore, that the casings of all the transformers are earthed through the outer conductor 47 and that there is a circuit across the phase winding 36 of the main transformer 33 through fuse 53, core 46 of the cable length 43, coil 21 of transformer 40, core 46 of the cable length 44, coil 21 of transformer 41, core 46 of cable length 45, coil 21 of transformer 42, casing of transformer 42, conductor 47 of cable length 45, casing of transformer 41, conductor 47 of cable length 44, casing of transformer 40, conductor 47 of cable length 43 and conductor 49. The spare gland 16 in the sub-base of the transformer 42 may be closed in any suitable manner.

Each flexible cable 28 is also of the kind comprising an inner core 50 and a concentric outer conductor 51 of braided wire insulated from the core and protected by a suitable covering from mechanical damage. Furthermore, one terminal of each secondary coil 20 is connected at 52 to the casing 9 of the transformer which casing is also connected at 101 with the conductor 51 and the other terminal of the coil is connected to the core 50. The other end of the core 50 is connected with a terminal of the lamp socket and the second terminal of the lamp socket is connected at 102 to the metal parts of the lantern and thereby to the conductor 51. Hence the metal parts of the lantern are earthed and there is a circuit across the secondary coil 20 through the cable 28 and the filament of the lamp 6.

Generally, similar groups of series connected transformers will be connected across the phase windings 37 and 38 of the main transformer 33 in order to maintain the balance of the system.

Usually a larger number of series connected transformers will be employed than is shown in Figure 3 and in designing the transformers not only are the core and primary coils proportioned so that whether a secondary coil is in position or is removed the current flowing in the series circuit remains substantially constant, but the primary coils are designed to allow the desired number of transformers to be connected in series across the particular value of main voltage. For example, if with a main supply of 100 volts ten lamps are required, then the primary coil of each of the ten series connected transformers would be wound with a number of turns appropriate to 10 volts. Such division of the main voltage is advantageous since, for one thing, the primary coil may be of robust construction.

In one particular example the main supply was at 105 volts, 50 cycles and seven series connected transformers were used, each equipped with one 100 watt, 25 volt lamp. The primary current when all the lamps were lighted was 11.25 amperes with a pressure drop across each primary coil of 15 volts. The secondary coil of each transformer passed 4 amperes at 25 volts.

The core of each transformer comprised ninety E-shaped stampings giving a core 1.75 inches in thickness, the central limb being 1 inch wide and each side limb 0.5 of an inch in width. The yoke consisted of twenty-three laminations, each 0.5 mm. thick, separated by brass washers to make up a thickness of 1.75 inches, the width of the yoke being 0.5 of an inch. It will be seen that the cross-section of the yoke was little more than one quarter of that of either side limb. The overall dimensions of the core were 5.38 inches approximately in the direction of the limbs and 3.5 inches transversely to the limbs.

Each primary coil consisted of seventy-five turns of No. 12 S. W. G. insulated copper wire and each secondary coil of one hundred and eighty turns of No. 17 S. W. G. insulated copper wire. In operation when the secondary coil of a transformer was removed the primary current remained at 11.25 amperes and the pressure drop across the primary winding was substantially unaltered.

In the modification shown in Figure 4 the transformers are divided into two groups, one group including the transformers 40, 41 and 42 and the second group including the transformers 55 and 56, the second group being fed through a coupling transformer 54 of suitable size and similar to the series transformers described above. As shown, the terminal of the coil 21 of the transformer 42 instead of being connected to the casing of the transformer as in Figure 3 is connected through the core 46 of a length of cable 57 to a terminal of the primary coil 21 of the coupling transformer 54. The other terminal of that coil is connected to the casing 9 of the coupling transformer, which casing is connected through the conductor 47 of the cable length 57 with the casing 9 of the transformer 42. The primary coil 21 of the transformer 54 is therefore energized together with the primary coils of the transformers 40, 41 and 42.

When the secondary coil 20 of the coupling transformer 54 is in position there is a circuit across the coil through core 46 of cable length 58, primary coil 24 of transformer 55, core 46 of cable length 59, primary coil 21 of transformer 56, casing of transformer 56, conductor 47 of cable length 59, casing of transformer 55, conductor 47 of cable length 58 and casing of the transformer 54. Thus the transformers 55 and 56 supply power to their lamps and the exposed metal parts of the transformers and the associated lanterns are connected to earth through the casing 9 of the coupling transformer. Preferably the transformer 54 is so designed that the transformers 55 and 56 and the transformers 40, 41 and 42 may be of the same design.

The cable connecting the primary coils of the series connected transformers may be associated with the main transformer through a plug and socket and an explosion proof switch, the plug being interlocked with the switch in such a way that the plug may be removed from the socket or replaced only when the switch is open.

If desired the power factor of the system may be improved by means of a condenser or similar device placed across the terminals of the supply either directly or through the medium of an appropriate transformer.

If desired suitable means may be provided for preventing removal of a bell glass unless the cover of the casing and the secondary coil are withdrawn. For example, in Figure 1 the glass may be held in position by means arranged beneath the cover so that access may be had thereto only when the cover is removed. Moreover, spring contacts mounted on the cover 6 and adapted to engage the wall 15 of the casing as the cover is being placed in position or removed may be provided to ensure that the cover is earthed whenever there is a possibility of its being live.

Any suitable form of cable may be used, for example a three core cable, one core constituting an earthing wire.

The construction of the removable yoke may be simplified by using a single plate of magnetic material of cross section such as will produce the desired degree of saturation. The plate may be of material commonly used for transformer cores or it may be of cast iron. Such a plate denoted by the numeral 100 is indicated by dotted lines in Figure 1 of the drawings.

Instead of enclosing the primary coil in an annular container the lower part of the casing containing the coil may be separated from the top part of the casing by placing a diaphragm over the coil. The diaphragm may comprise a circular sheet of non-magnetic high resistance alloy with a facing formed of a sheet of insulating material on the side thereof adjacent to the primary coil. The diaphragm is formed with suitable slits for enabling the diaphragm to be threaded onto the limbs of the core and the sheet of alloy is split in order to prevent currents circulating therein. A ring of moulded insulating material fits the inside of the casing and is formed with a flange that engages the upper peripheral surface of the diaphragm, whilst sleeves of insulating material separate the edges of the slits from the limbs of the core. The lower part of the casing thus separated by the diaphragm may be filled with insulating compound.

When the flange is extended to protect the secondary coil a similar diaphragm may be provided at the open end of the flange, but in this case suitable tubes will extend between the slits in the diaphragm and the yoke in order to exclude compound from the spaces into which the upper parts of the limbs of the core fit when the yoke is in position.

We claim:—

1. An alternating current electric lighting system for lighting a place subject to explosive atmosphere, comprising a plurality of transformers each including a readily removable secondary winding and a primary provided with a magnetic circuit which includes a core of magnetic material and which has a magnetic reluctance approximately the same whether the secondary winding is in position or is removed, a primary power supply circuit which is adapted to be supplied with electric power from a constant voltage electric power supply and in which the primary windings of the transformers are joined in series with one another, and electric lamp circuits connected with the secondary windings of transformers.

2. An alternating current electric lighting system for lighting a place subject to explosive atmosphere, comprising a plurality of transformers each provided with primary and secondary windings and formed with relatively movable parts arranged so that through relative movement of the said parts the mutual inductance between the primary and secondary windings may be reduced at least to a negligible value to interrupt the secondary power supply and restored to a maximum value to re-establish the secondary power supply without appreciably affecting the impedance of the primary winding, a primary power supply circuit adapted to receive power from a constant voltage power supply and in which the primary windings of the transformers are joined in series with one another, and local electric lamp circuits connected with the secondary windings of the transformers.

3. An alternating current electric lighting system for lighting a place subject to explosive atmosphere, comprising a plurality of transformers each including a readily removable secondary winding and a primary winding the impedance of which is substantially unaffected by removal of the associated secondary winding, a plurality of local electric lamp circuits each connected with a secondary transformer winding and a primary power supply circuit which is arranged to receive electric power from a constant voltage power supply and in which the primary windings of the transformers are joined in series with one another.

4. An alternating current electric lighting system for lighting a place subject to explosive atmosphere, comprising a plurality of transformers each provided with primary and secondary windings and including relatively movable parts arranged so that through relative movement of the said parts the mutual induction between the primary and secondary windings may be reduced at least to a negligible value to interrupt the secondary power supply and restored to a maximum value to re-establish the secondary power supply without appreciably affecting the impedance of the primary winding, a primary electric power supply circuit adapted to be fed from a constant voltage source and including an insulated conductor connecting in series the primary windings of the transformers, enclosing metallic casings for the said conductor and the transformers forming a return circuit of the said primary windings, an earthing connection for the said casings and local electric lamp circuits connected with the secondary windings of the transformers.

5. An alternating current electric lighting system for lighting a place subject to explosive atmosphere, comprising with a coupling transformer provided with primary and secondary windings which are readily separable, two groups of transformers, each group including a plurality of transformers each provided with primary and secondary windings and formed with relatively movable parts arranged so that through relative movement of the said parts the mutual induction between the primary and secondary windings may be reduced at least to a negligible value to interrupt the secondary power supply and restored to a maximum value to re-establish the secondary power supply without appreciably affecting the impedance of the primary winding, a primary power supply circuit adapted to receive power from a constant voltage power supply and in which the primary windings of the transformers of one group and one winding of the coupling transformer are joined in series with one another, a primary power supply circuit in which the primary windings of the transformers of the other group and the other winding of the coupling transformer are joined in series with one another, and local electric lamp circuits connected with the secondary windings of the transformers.

6. An alternating current electric lighting system for lighting a place subject to explosive atmosphere, wherein the power circuit is fed from a constant voltage supply, comprising a plurality of transformers including primary windings in series in said power circuit and readily removable secondary windings, the number of transformers in series and the selection of the windings being such that the impedance of the circuit remains substantially constant whether or not one of the secondary windings is removed, and lamp circuits connected with said secondary windings, the arrangement being such that the current delivered to the respective lamp circuits remains approximately constant whether or not one of said secondary windings is removed.

7. An alternating current electric lighting system as claimed in claim 1, in which the respective transformers include a compact casing arranged to contain the primary and secondary windings, said casing consisting at least partly of an alloy which is non-magnetic and a poor conductor of electricity.

8. An alternating current electric lighting system as claimed in claim 1, in which said core of magnetic material of the respective transformers cooperates with a yoke of magnetic material which is removable with the secondary winding and said yoke consists of a plate of such cross section as to give a flux density relatively much greater than that in said core.

9. An alternating current electric lighting system as claimed in claim 1, in which the respective transformer units comprise a casing of electrically conductive material, a readily removable cover to the casing, the secondary winding of the transformer being mounted on and removable with said cover, an electrical connection for connecting one terminal of said secondary winding with the casing, a lamp fitting provided with exposed electrically conductive parts and a lampholder the terminals of which are connected respectively to the other terminal of the secondary winding and to said exposed parts of the lampholder and to the casing.

10. An alternating current electric lighting system as claimed in claim 1, in which the respective transformer units include a casing for the windings, a readily removable cover to the casing, the secondary winding of the transformer being mounted on and removable with said cover and a flange extending from the cover and surrounding said secondary winding.

WILLIAM CRAMP.
NORMAN HALIFAX SEARBY.